United States Patent [19]

Anton

[11] Patent Number: 5,194,578

[45] Date of Patent: Mar. 16, 1993

[54] FIBER-FORMING COPOLYAMIDE FROM 2-METHYL-PENTAMETHYLENE DIAMINE

[75] Inventor: Anthony Anton, Wilmington, Del.

[73] Assignee: E.I. Du Pont de Nemours and Company, Wilmington, Del.

[21] Appl. No.: 541,696

[22] Filed: Jun. 21, 1990

[51] Int. Cl.$^5$ ............................................. C08G 69/26
[52] U.S. Cl. .................................. 528/349; 528/335; 528/336; 528/340
[58] Field of Search ................. 528/349, 340, 336, 335

[56] References Cited

U.S. PATENT DOCUMENTS

| | | | |
|---|---|---|---|
| 2,193,529 | 3/1940 | Coffman | 260/78 |
| 2,245,129 | 6/1941 | Greenewalt | 260/2 |
| 2,752,328 | 6/1956 | Magat | 260/78 |
| 2,965,616 | 12/1960 | Caldwell et al. | 260/78 |
| 3,418,199 | 12/1968 | Anton et al. | 161/175 |
| 3,557,544 | 1/1971 | Simons | 57/140 |
| 3,583,949 | 6/1971 | Simons | 260/78 |
| 3,629,053 | 12/1971 | Kimura et al. | 161/173 |
| 3,790,531 | 2/1974 | Christoph et al. | 260/78 R |
| 3,872,055 | 3/1975 | Furukawa et al. | 260/45.7 P |
| 4,250,291 | 2/1981 | Gude et al. | 528/338 |
| 4,385,170 | 5/1983 | Hirami et al. | 528/338 |
| 4,476,280 | 10/1984 | Poppe et al. | 524/606 |
| 4,559,196 | 12/1985 | Kobsa et al. | 264/168 |
| 4,566,931 | 1/1986 | Panoch et al. | 156/330.9 |
| 4,925,914 | 5/1990 | Dolden et al. | 528/336 |
| 4,937,315 | 6/1990 | Barthelemy | 528/349 |
| 4,937,322 | 6/1990 | Barthelemy | 528/349 |

FOREIGN PATENT DOCUMENTS 49-21315  5/1974  Japan .
1224144  3/1971  United Kingdom .

OTHER PUBLICATIONS

One Page Advertisement in Chemical and Engineering News, first published in 1986. (Dec. 1986).

Product Description Pages for 2-methylpentamethylenediamine (Dec. 1986).

Primary Examiner—Harold D. Anderson

[57] ABSTRACT

A fiber-forming copolyamide consisting essentially of between about 60 and about 99.5 mole % hexamethylene adipamide units and between about 0.5 and 40 mole percent 2-methyl-pentamethylene adipamide units, the copolyamide having an RV greater than about 25, and a melting point of greater than about 220° C.

7 Claims, 5 Drawing Sheets molecular weight distribution

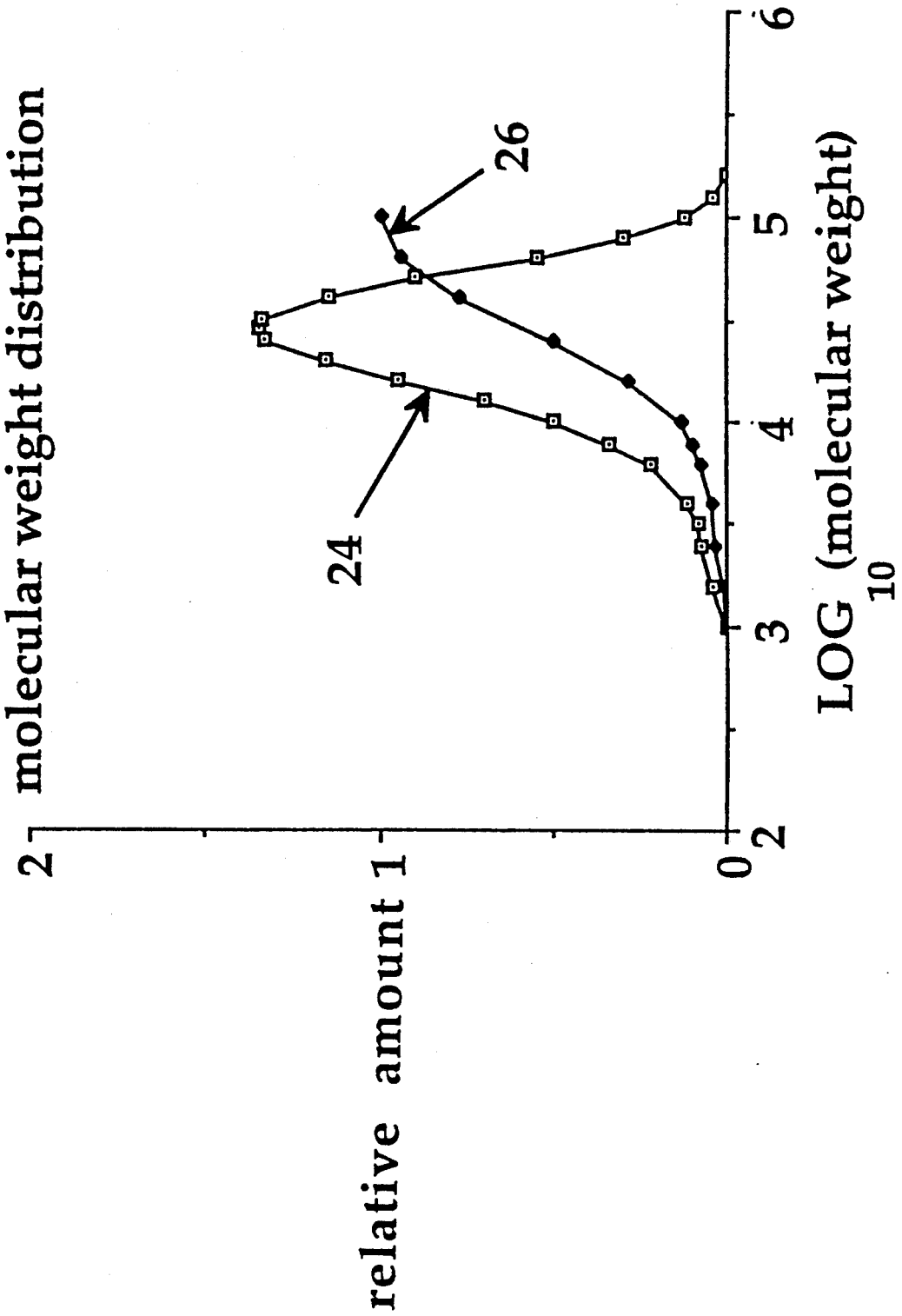
Figure 2b. molecular weight distribution

FIBER-FORMING COPOLYAMIDE FROM 2-METHYL-PENTAMETHYLENE DIAMINE

BACKGROUND OF THE INVENTION

The present invention relates to fiber-forming polymers and more particularly to a fiber-forming copolyamide having hexamethylene adipamide units and a minor portion of 2-methyl-pentamethylene adipamide units and fibers produced therefrom.

Nylon yarns are used in a wide variety of knit and woven fabrics for upholstery, swimwear, lingerie, hosiery and outerwear and in yarns used for carpeting. Most nylon yarns are spun from one of the two commonly used nylon polymers, poly(hexamethylene adipamide), referred to as nylon 66 and poly($\epsilon$-caproamide) referred to as nylon 6. While both polymers can be used for most types of textile yarns, the choice of either nylon 66 or nylon 6 is known to impart advantageous or disadvantageous properties to the yarns depending on the end use. However, for most nylon producers, it is not economically feasible to include products made from both types of polymer in their product line to accommodate end use needs.

While nylon 66 has a number of inherent advantages, nylon 66 producers recognize that nylon 66 is not as readily dyeable as nylon 6, especially with large bulky dye molecules such as those of pre-metalized and non-leveling acid dye classes. To increase dyeability, the salt used to make nylon 66, hexamethylene diammonium diadipate, has been copolymerized with 0.2 to 5% of $\omega$-aminocarboxylic acids having 4 or about 6-12 carbon such as $\epsilon$-caprolactam as disclosed in U.S. Pat. No. 3,707,522 so that the resulting copolymer is primarily nylon 66 with some other monomer such as $\epsilon$-caproamide (6 nylon) monomer. For convenience, the copolyamide containing $\epsilon$-caproamide will be referred to hereinafter as nylon 66/6.

One problem with nylon 66/6 fibers is that the copolymer contains unreacted $\epsilon$-caprolactam monomer and some cyclic oligomer. Without water extraction of the polymer, prolonged spinning of nylon 66/6 with as little as 1.5% $\epsilon$-caproamide produces monomer and oligomer which sublime onto the face of the spinneret requiring it to be wiped frequently. Consequently, continuity of the spinning is disrupted for "wiping" and the size of the yarn packages may be limited. Also, in feed yarns for texturing containing nylon 66/6, or in high RV, high speed spun yarns containing either homopolymer nylon 66 or nylon 66/6, monomer and oligomers continue to migrate from the interior to the surface of the yarn over time. Thus, the frictional properties of the yarn can change with aging which can cause an erratic response in texturing and deposits can be formed on the texturer's equipment requiring that frequent cleaning be performed. Moreover, nylon 66/6 fibers do not crystallize as readily as the homopolymer nylon 66, and as a result, are more difficult to stabilize in a fabric during heat setting.

While other monomers such as polyethers have been copolymerized with polyhexamethylene adipamide to improve dye receptivity, such fibers are not as white or as heat stable as those of 100% nylon 66 and therefore are often unsuitable for apparel textile uses.

SUMMARY OF THE INVENTION

In accordance with the invention, there is provided a fiber-forming copolyamide consisting essentially of between about 60 and about 99.5 mole % hexamethylene adipamide units and between about 0.5 and 40 mole percent 2-methyl-pentamethylene adipamide units, the copolyamide having an RV greater than about 25, and a melting point of greater than about 220° C. For convenience, the copolyamide of the invention will be referred to as nylon 66/Me5-6.

In a preferred form of the invention, the RV of the copolyamide is between about 30 and about 80, most preferably between about 30 and about 60. In another preferred form of the invention the copolyamide has a molecular weight distribution in which less than about 10% of the copolyamide comprises copolymer having a molecular weight of less than about 10,000.

The copolyamide of the invention in fibers provides deep dyeability with large or bulky dye molecules such as those of the pre-metalized and non-leveling acid dye classes. Dyeability is equivalent to that obtainable to nylon 6 fiber. Copolyamides of nylon 66/Me5-6 in accordance with the invention provide good melt spinning performance with low deposits on the spinneret face when the polymer is spun directly without water extraction. In addition, very low deposits, if any, are deposited by the fiber on processing equipment such as in texturing processes and the amount of deposits does not change with the age of the yarn. In addition, the molten copolyamide of the invention forms gel much less readily than homopolymer nylon 66 and provides increases in spinning process continuity and decreases in equipment maintenance costs.

Another advantage is that the fibers of the copolyamide of the invention offer a range of boil-off shrinkage levels including a high shrinkage level as is desired for some applications. High shrinkage levels equivalent to those obtainable from nylon 6 fibers can be provided by the copolyamides in accordance with the invention. High moisture gain yarns can also be provided.

In high speed spun draw-texturing feed yarns, the copolyamide of the invention provides yarns with low draw tensions and high elongations at low RV levels. Thus, the copolyamide can provide equivalent draw-texturing performance in draw-texturing feed yarns without the deposits which are associated with fibers of high RV nylon 66. In addition, novel high shrinkage, draw-textured yarns can be provided using the copolyamide in accordance with the invention.

BRIEF DESCRIPTION OF THE DRAWINGS

FIGS. 2a and 2b are graphical representation of the molecular weight distributions observed by gel permeation chromatography of a copolyamide in accordance with the invention compared with a nylon 6/66 copolyamide, respectively, showing the percentage of the copolymer fraction having a molecular weight distribution of less than 10,000.

DETAILED DESCRIPTION

The fiber-forming copolyamides of the invention are substantially linear copolyamides which consist essentially of between about 60 and about 99.5 mole % hexamethylene adipamide units and between about 0.5 and 40 mole percent 2-methyl-pentamethylene adipamide (Me5-6) units. In the preferred copolyamides, the Me5-6 units are generally randomly distributed throughout the copolymer. The copolyamide has properties similar to homopolymer nylon 66 but with significant process advantages in fiber production and advantages in end use as will become more apparent hereinafter.

Depending on the intended end use of copolyamides of the invention, it is advantageous to employ varying mole percentages of Me5-6 in the copolyamide. For example, to increase dyeability of fibers produced from the copolyamide, quantities as low as 0.5%, but generally not more than about 10% to avoid affecting other properties in the fiber, are effective. It is preferred to use at least about 1.5% to improve dyeability. If a high shrinkage or fiber having properties similar a poly(ε-caproamide) fiber is desired, a higher percentage of Me5-6 in the copolyamide is desirable, e.g., such as between about 35 and about 40%. For use in the production of high speed spun draw-texturing feed yarns for hosiery use, it is advantageous to use generally between about 2 and about 8% Me5-6 in the copolyamide. For a feed yarn to be draw-textured to produce a high-shrinkage textured yarn suitable for use as a wrapping yarn, percentages such as between about 35 and about 40% can be used.

The copolyamides in accordance with the invention have a formic acid relative viscosity (RV) greater than about 25 and are useful for the manufacture of fibers by melt spinning. For the production of most fibers, an RV of between about 30 and about 80 is preferred, most preferably between about 30 and 60 for textile fiber uses.

The melting point of copolyamides in accordance with the invention is greater than about 220° C. The melting points of the copolyamides vary with the percentage of Me5-6 and thus range very close to the melting point of homopolymer nylon 66 polymer, about 265° C., where the percentage of Me5-6 is about 0.5%. With increasing Me5-6, the melting point decreases to about 220° C. where the Me5-6 percentage is about 40%.

It has been discovered that the molecular weight distribution of preferred copolyamides determined by gel permeation chromatography (GPC) is such that there is substantially less low molecular weight material in the preferred copolyamides of the invention than in homopolymer nylon 66. In the preferred copolyamides, less than about 10% by weight of copolyamide is made up of polymer having a molecular weight of less than 10,000. This can be up to 43% less low molecular weight fraction (molecular weight less than 10,000) than homopolymer nylon 66 at an equivalent RV.

Figure 1:
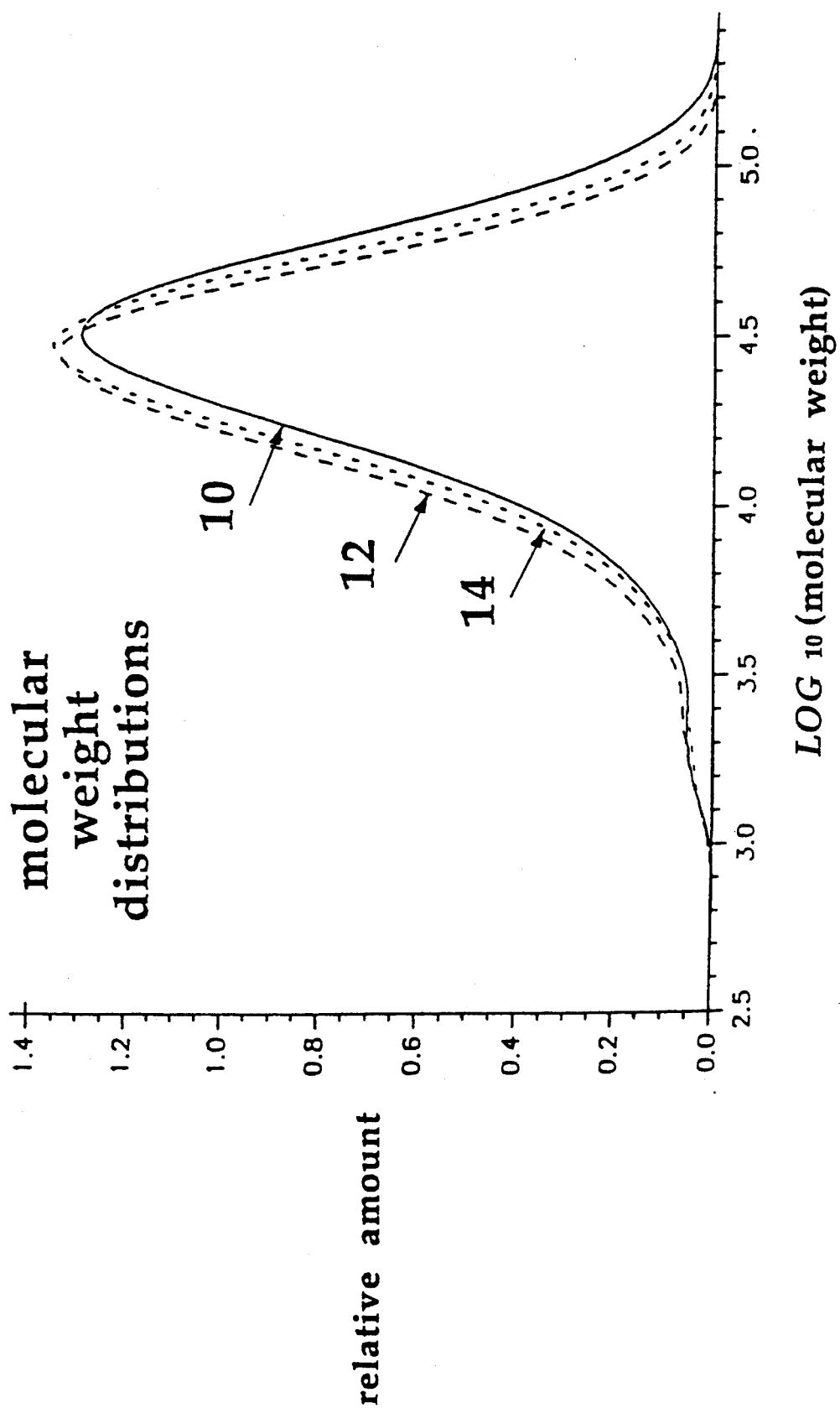
FIG. 1 is a graphical representation of the molecular weight distributions observed by gel permeation chromatography of nylon 66 homopolymer and nylon 66/6 copolyamides containing two levels of $\epsilon$-caproamide.
Figure 2A:
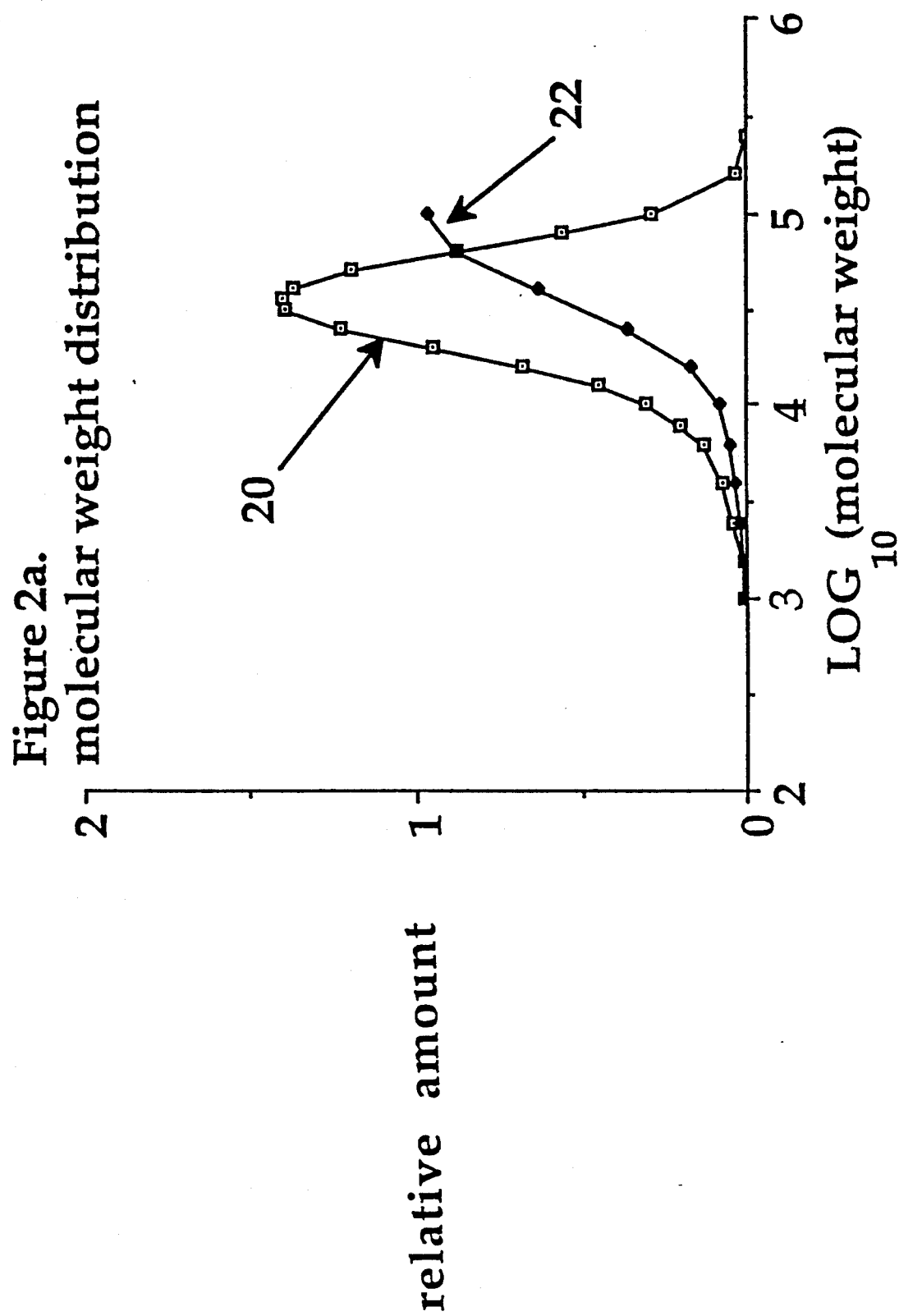

FIG. 1 illustrates GPC determined molecular weight distributions of homopolymer nylon 66 and two nylon 66/6 copolymers. The molecular weight distribution identified by the numeral 10 in FIG. 1 is a standard sample of nylon 66 homopolymer (ZYTEL ® 101), 12 is a molecular weight distribution for a sample of nylon 66/6 with 5% ε-caproamide units and 14 is a molecular weight distribution for another nylon 66/6 with 1.5% ε-caproamide units. FIG. 1 illustrates that nylon 66 homopolymer and nylon 66/6 copolymers exhibit a "tail" of low molecular weight species (e.g. less than 10,000). FIG. 1 shows that this bimodal distribution of molecular weight in these samples is readily detectable. FIG. 2a and 2b illustrate molecular weight distributions for a nylon 66/Me5-6 and a nylon 66 homopolymer, respectively. In FIG. 2a, the molecular weight distribution (20) for a 35% Me5-6 containing copolymer shows a fraction of low molecular weight species up to 10,000 of 8%, based on the integral 22 of curve 20. By contrast, the homopolymer in FIG. 2b. (curve 24) shows a fraction of species up to 10,000 equal to 14% of the total area, based on the integral 26.

The copolyamides of the invention also have low levels of "extractable oligomer," i.e., low levels of polymer having a low molecular weight of less than 500 as shown in the following table. In preferred copolyamides in accordance with the invention, less than 60% of "extractables" have a molecular weight of less than 500 as observed by that GPC. "Extractables" as used in this application refers to the material contained in the supernatant liquid after dissolving the copolymer in formic acid and precipitating with 5:1 methanol-water.

| Yarn Type | Weight % of Extractables having a MW Less Than 500 |
|---|---|
| Nylon 66 homopolymer | |
| Control 1 | 64 |
| Control 2 | 71 |
| 95%/5% 66/Me5-6 | 59 |
| 90%/10% 66/Me5-6 | 50 |

It is believed that the improved molecular weight distribution and/or lower extractable oligomer levels are responsible for the decreased deposits on the spinneret face in spinning and the decreased deposits on texturing equipment when the yarn is used in texturing processes.

Figure 3:
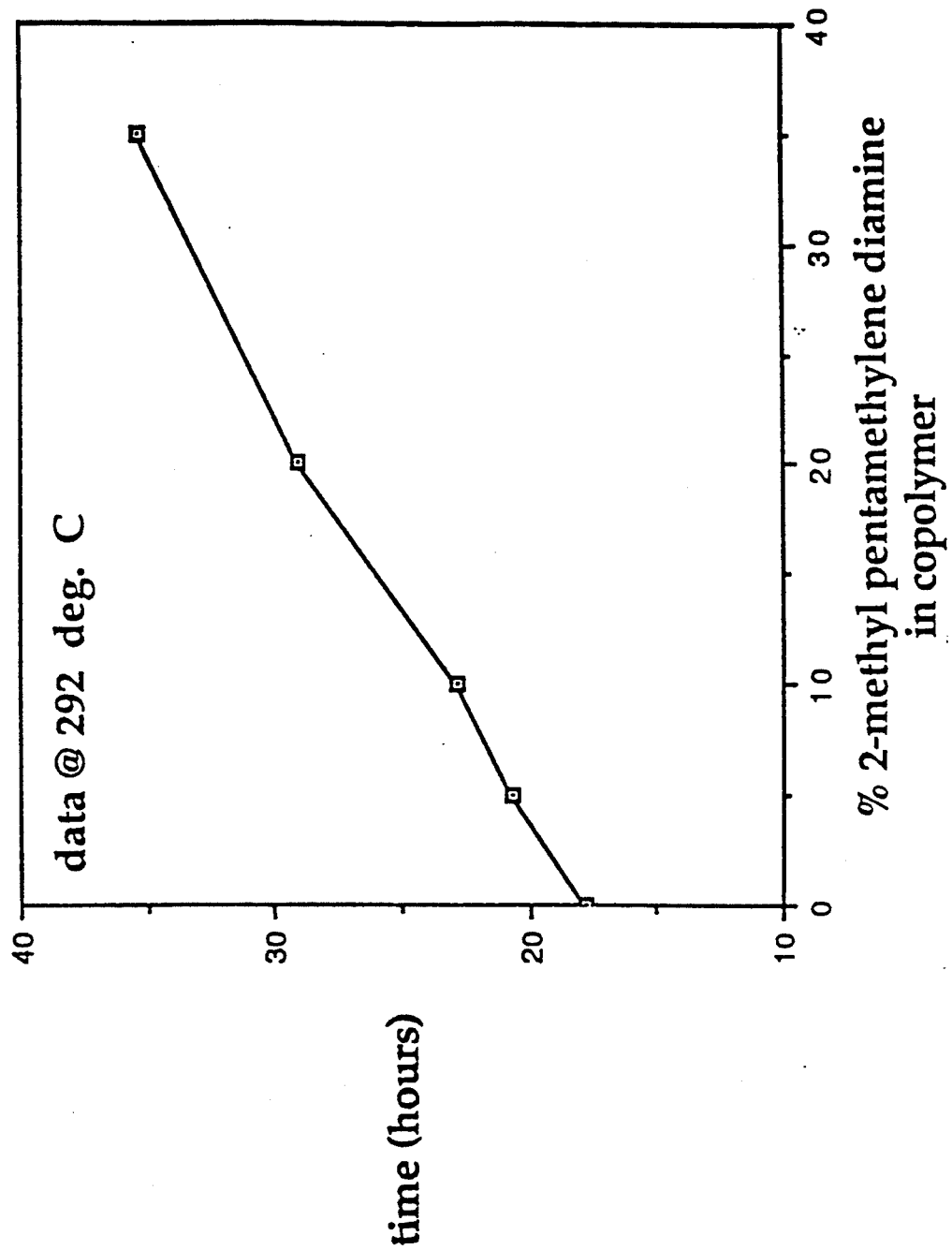
FIGS. 3 and 4 are graphical representations of gelation time for copolyamides in accordance with the invention at 292° C. and 281° C., respectively.
Figure 4:
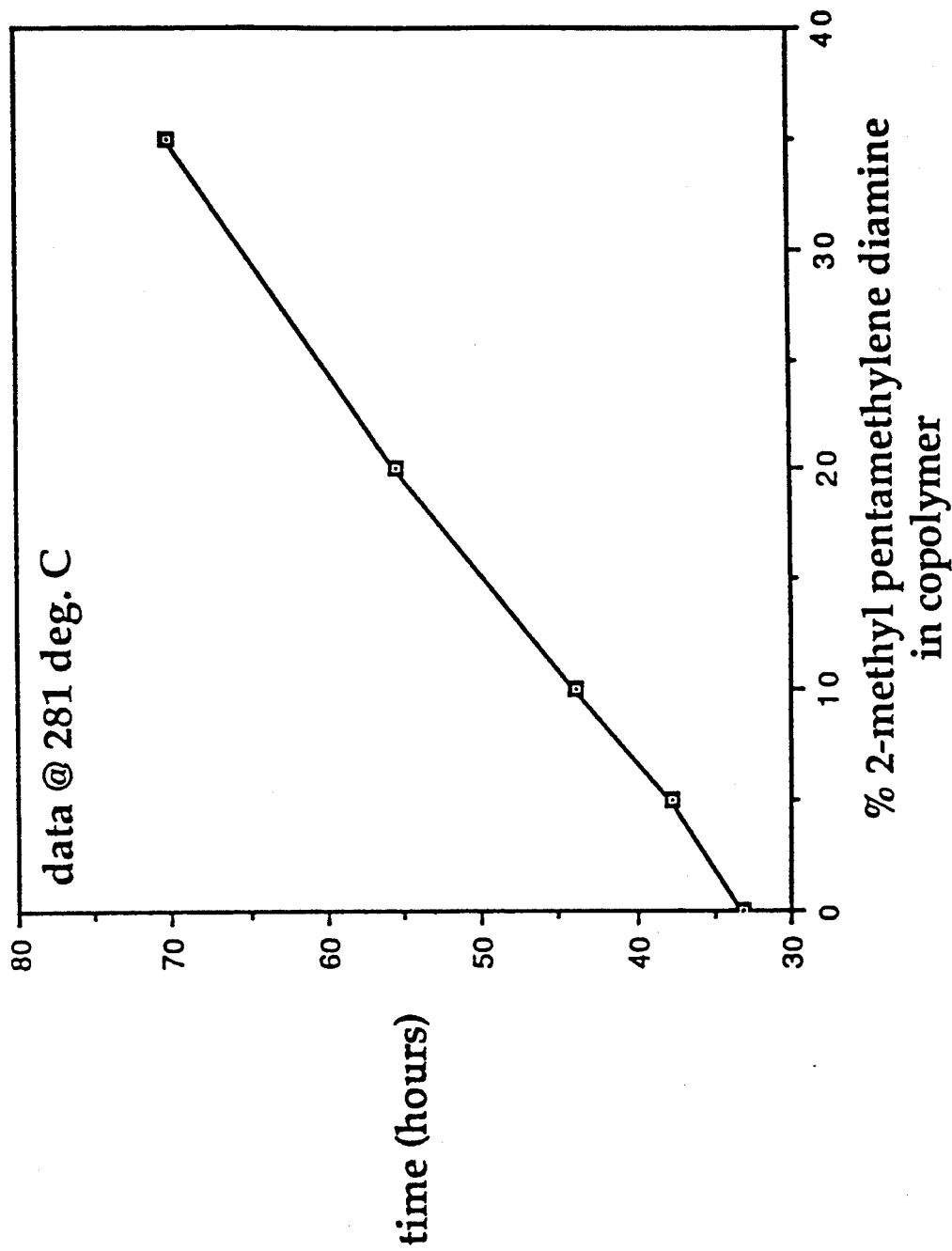

Surprisingly, the copolyamides of the invention have also been found to form "gel" at a substantially lower rate than nylon 66 homopolymer. "Gel" refers to the very high molecular weight, cross-linked polymer which forms in the nylon 66 polymer melt and which collects in the transfer line, the spinneret pack filter and other areas in contact with the molten polymer before spinning. The gel is essentially insoluble and often can only be removed from equipment using extreme measures such as by burning off of the gel. As shown in FIGS. 3 and 4, the gelation time, the time required to show an inflection in melt viscosity behavior of a polymer sample maintained at a constant temperature, increases significantly, and in a nearly linear fashion with increasing percentages of Me5-6. In addition, since the melting point of the copolyamide is lower and is substantially lower at high Me5-6 mole percentages, the gelation time can be further increased by employing lower polymer melt temperatures without affecting spinning performance.

The rate of crystallization of the copolymer of the invention is lower than in homopolymer nylon 66 and is dependent on the mole % Me5-6 in the copolyamide. The amount of spherulites formed in fibers is also lower. The polyamide is useful for high quality ultra-fine denier nylon fiber and can provide fibers with improved optical clarity.

The copolyamides of the invention can be prepared by condensation polymerization in an aqueous "salt" solution formed by mixing adipic acid with hexamethylene diamine (HMD) and 2-methyl-pentamethylene diamine (MPMD) in the molar proportions necessary to produce the copolymer with the desired mole percent Me5-6 units. Procedures useful for the production of homopolymer poly(hexamethylene adipamide) can be applied to the production of the copolymer of the invention. It is generally necessary, however, to modify such procedures to make sure that the MPMD, which is more volatile, stays in solution sufficiently long to react. 2-methyl-pentamethylene diamine is commercially available and is sold by E. I. du Pont de Nemours & Co., Wilmington, Del., under the trademark DYTEK A ®.

A particularly convenient method for making a copolyamide in accordance with the invention is to provide two aqueous salt solutions of hexamethylene diammonium adipate and 2-methyl-pentamethylene diammonium adipate. Necessary quantities of the two solutions can be readily mixed to produce a salt solution for the desired copolyamide. It has been found that it is advantageous to employ salt solutions in which the pH of the solution is about 1 pH unit above the neutralization pH which assists in keeping the MPMD in solution.

It is usually desirable to add a catalyst to the salt solution. A variety of catalysts are known for use in polymerizing homopolymer nylon 66 such as phenyl phosphinic acid, manganese hypophosphite, etc., and these have been found to be useful in the polymerization of copolymers of the invention.

The salt solution with catalyst is reacted in a suitable reaction vessel such as an autoclave under an inert atmosphere. One preferred procedure which has been found to keep the volatile MPMD in solution includes purging the autoclave with nitrogen and increasing the pressure to about 300 psi. The salt solution is heated to a temperature between about 175° C. and about 200° C. for a sufficient time that the oligomers incorporating the MPMD are formed, typically about an hour. The temperature is then increased to between about 250° C. and about 275° C. which is somewhat lower than that typically used for nylon 66. The pressure is then released over, for example, 1 hour to bleed off steam and approximately the same temperature is maintained while purging with nitrogen for sufficient time to complete the reaction to the extent desired. The copolyamide is extruded from the autoclave into water and conveniently chipped and dried to produce flake. The RV of the polymer from the clave can be in the range of 25-80 but is typically in the range of 25-45.

The copolyamide in accordance with the invention can also be made by any of a variety of continuous polymerization processes.

The polymer flake is useful in the spinning of fibers which can be spun using a wide variety known melt spinning techniques. In addition, as will be illustrated in the examples which follow, the copolyamide is particularly useful in high speed spinning techniques to obtain high quality feed yarns for use in draw texturing and for warp-drawing. High speed spun draw-texturing feed yarns can be spun in a process such as that disclosed in U.S. Reissue Pat. No. 33,059, which is hereby incorporated by reference. However, Me5-6 is capable of hydrogen bonding with the nylon 66 polymer and thus the nylon 66/Me5-6 copolyamide has a modified hydrogen-bonded structure which provides lower draw tension yarns spun at high spinning speeds, e.g., greater than about 4500 mpm. In addition, the lower draw tensions, can be provided at lower RV levels which decreases the amount of deposits which form when high RV nylon 66 polymer is used for draw-texturing feed yarns.

In staple preparation, melt spun fibers from a number of spinning positions are converged into a 600,000-850,000 denier tow line which is then drawn crimped, cut at the appropriate cut length and baled in separate operations. A high shrinkage (25-30%) Me-5-6/66 (40%/60%) staple can be prepared in this manner. The staple can be converted to yarn in 100% form and used to create high-low pile texture effects when woven adjacent to ends of standard nylon in piece-dyed velour upholstery fabrics. Blends of the high shrinkage Me5-6 66 fiber with the standard nylon (e.g. 50/50 blend) will impart bulk to piece-dyed flat woven or knit fabrics for apparel and upholstery.

Before spinning, the RV of the copolyamide flake can be increased by conventional solid phase polymerization (by removing water under controlled temperature and inert gaseous conditions). In addition, the RV may also be increased as the polymer is melted in an extruder such as before melt spinning of fiber, if desired, by venting off water or by introducing flake from solid phase polymerization which has less than the equilibrium moisture at the given melt temperature. In the alternative, water can be added during solid phase polymerization to decrease RV if desired.

For use of the composition in fibers, any of a variety of known additives such as delustrants, e.g., titanium dioxide, antioxidants, pigments, and other materials may be added to the copolyamide at a suitable point in the polymer preparation or, for example, as the flake is melted in an extruder in advance of spinning.

The following examples are offered for the purposes of illustrating the invention and not intended to be limiting. Percentages are by weight except for the mole percentages of 66 and Me5-6 monomer units and as indicated otherwise. The test methods which follow were used for obtaining the results reported.

TEST METHODS

The formic acid relative viscosity (RV) of the polyamide is measured as described at col. 2, l. 42-51, in Jennings, U.S. Pat. No. 4,702,875 which provides: The relative viscosity (RV) of polyhexamethylene adipamide is the ratio of the viscosity of the solution of 8.4 percent (by weight) polymer in a solution of 90 percent formic acid and 10 percent water (by weight) at 25° C., to viscosity of the formic acid water solution, per se, measured in the same units at 25° C.

The amount of Me5-6 is determined by heating two grams of the polymer in flake, film, fiber, or other form (surface materials such as finishes being removed) at 100° C. overnight in a solution containing 20 mls of concentrated hydrochloric acid and 5 mls of water. The solution is then cooled to room temperature, adipic acid precipitates out and may be removed. (If any TiO2 is present it should be removed by filtering or centrifuging.) One ml of this solution is neutralized with one ml of 33% sodium hydroxide in water. One ml of acetonitrile is added to the neutralized solution and the mixture is shaken. Two phases form. The diamines (MPMD AND HMD) are in the upper phase. One microliter of this upper phase is analyzed by Gas Chromatography such as a capillary Gas Chromatograph having a 30 meter DB-5 column (95% dimethylpolysiloxane/5% diphenylpolysiloxane) is used although other columns and supports are suitable for this measurement. A suitable temperature program is 100° C. for 4 minutes then heating at a rate of 8° C./min up to 250° C. The diamines elute from the column in about 5 minutes, the MPMD eluting first. The percentage Me5-6 is calculated from the ratio of the integrated areas under the peaks for the MPMD and HMD.

Amine and carboxyl ends are determined by the methods described on pages 293 and 294 in volume 17 of the "Encyclopedia of Industrial Chemical Analysis" published by John Wiley & Sons, Inc. in 1973.

Denier of the yarn is measured according to ASTM Designation D-1907-80. Denier may also be measured by means of automatic cut-and-weigh apparatus such as that described by Goodrich et al in U.S. Pat. No. 4,084,434.

Tensile properties (Tenacity, Elongation Modulus), are measured as described by Li in U.S. Pat. No. 4,521,484 at col. 2, 1. 61 to col. 3, 1. 6.

Boil-Off Shrinkage is measured according to the method in U.S. Pat. No. 3,772,872 column 3, line 49 to column 3 line 66.

Density of the polyamide fiber is measured by use of the standard density gradient column technique using carbon tetrachloride and heptane liquids, at 25° C.

The beta ($\beta$) crystallinity is calculated from fiber density measurements using the following formula:

$$\beta = [(Dm-Da)/Dc-Da].(Dc/Dm)$$

where:
Dc = Density of perfectly crystalline phase
Da = Density of amorphous phase
Dm = Experimentally measured density*
for nylon-6,6 Dc = 1.22 g/cm$^3$ and Da = 1.069 g/cm$^3$
[*H. W. Starkweather, Jr., R. E. Mornihan. J. Poly. Sci. 22, 363, (1956)].

Melting Behavior, including initial melt rate, is measured by a Differential Scanning Calorimeter (DSC) or a Differential Thermal Analyzer (DTA). Several instruments are suitable for this measurement. One of these is the Du Pont Thermal Analyzer made by E. I. Du Pont de Nemours and Company of Wilmington, Del. Samples of 3.0±0.2 mg. are placed in aluminum capsules with caps and crimped in a crimping device all provided by the instrument manufacturer. The samples are heated at a rate of 20° C. per minute under a nitrogen atmosphere (inlet flow 43 ml/min.) using the glass bell jar cover provided by the instrument manufacturer. After the sample is melted the cooling exotherm is determined by cooling the sample at 10° C. per minute under the nitrogen atmosphere. The cooling exotherm is used to determine the crystallization point.

The crystalline perfection index (CPI) and orientation angle (OA) were measured and calculated by the methods described in papers by P. F. Dismore and W. O. Statton in Journal of Polymer Science Part 22, Page 133 (1966) and by C. W. Bunn and E. V. Garner in Proceedings of the Royal Society (London), A189 (1947).

Molecular weight distributions are determined by gel permeation chromatography (GPC). A Waters 150-C liquid chromatograph operating at 35° C. with a mobile phase of 0.01M sodium trifluoroacetate in hexafluoroisopropanol (HFIP) and two Shodex KF-80M/HFIP columns are used. Calibration of the molecular weight distribution is done via the "cumulative matching" technique with an assumed most probable distribution of species for a nylon 66 oratory standard (ZYTEL® 101).

Weight % of "extractables" having a molecular weight of less than 500 is obtained by dissolving a weighed yarn sample in formic acid and precipitating the high molecular weight fraction from a 5:1 methanol-water solution. The supernatant methanol-water solution, which was separated from the precipitated polymer, contains the oligomer fraction defined as "extractables". This solution is evaporated to dryness and weighed. The residue is washed in hexane to remove yarn finish, dried and weighed. This dried residue is submitted for gel permeation chromatographic analysis. The hexane wash to remove finish, can be examined by proton NMR for nylon components, e.g. adipic acid, hexamethylene diamine, 2-methyl pentamethylene diamine, and oligomers to confirm that none of these components are in the hexane wash.

EXAMPLE I

A MPMD/adipic acid salt solution (approximately 65% concentration) was prepared and balanced with MPMD to a pH of 8.5. The nylon 66 salt solution (approximately 50% concentration) was also balanced to a PH of 8.5. The two solutions were charged to an autoclave at specific weights to give the mole ratio of 66/Me5-6 units shown in Table I(a). Quantities of MPMD, adipic acid, and water to make the MPMD/adipic acid solutions are given. The indicated amounts of phenylphosphinic acid to serve as a catalyst were added to the autoclave (about one gram for every kilogram of dry salt).

TABLE I(a)

| Nylon 66/Me5-6 | Clave Size | MPMD (g) | Adipic Acid (g) | H$_2$O (g) | Nylon 66 Salt (g) | Catalysts (g) |
|---|---|---|---|---|---|---|
| 100/0 | 1 gal. | — | — | — (50.7%) | 1820 | 0.9 |
| 90/10 | 1 gal. | 50 | 63 | 100 (51.3%) | 2016 | 0.9 |
| 80/20 | 35 lb. | 1006 | 1265 | 2270 (51.3%) | 18,200 | 12.0 |
| 60/40 | 1 gal. | 272 | 343 | 500 (50.7%) | 1820 | 1.5 |

The autoclave was purged with nitrogen and sealed. The pressure release valve on the clave was set to 300 psi and the clave was heated to 200° C. At this point, the pressure read approximately 200 psi. The temperature was held at 200° C. for one hour. At the end of the hour, the temperature was raised to 250° C. When the pressure reached 300 psi at approximately 213° C., steam was bled off. When the temperature reached 250° C., the pressure reduction cycle was started so that the pressure was reduced to atmospheric over one hour. At the same time, the temperature of the autoclave was raised to 275° C. When the pressure reached atmospheric, it was held for 45 minutes with a nitrogen purge. The polymer was then extruded under nitrogen pressure in the form of a ribbon which was quenched on a water-cooled casting wheel and cut into 1.8" (3 mm) flake and dried in the conventional manner. Proceeding in this manner, copolyamides having the compositions and properties in Table I(b) were prepared.

TABLE I(b)

| Nylon 66/Me5-6 | Relative Viscosity | End Groups (Equiv./10⁶ g) | |
|---|---|---|---|
| | | Amine | Carboxyl |
| 100/0 | 52.9 | 60.5 | 70.0 |
| 90/10 | 53.0 | 56.7 | 65.4 |
| 80/20 | 61.3 | 63.2 | 45.0 |
| 60/40 | 31.8 | 63.4 | 82.5 |

For melt spinning, the dried polymer was charged to the hopper of a conventional prototype nylon spin-draw process and kept under a nitrogen blanket. The spin temperature zone was set at 237° to 283° C. and the spinneret temperature was set at 265° to 270° C., depending on the melting point of the polymer. The filaments were extruded from a 17 hole round cross-section spinneret, and were drawn 3–3.5× over a hot pin set at a temperature of 85° C. The basic fiber properties summarized in Table II illustrate that the tenacity (grams per denier) (g/d) and elongation (percent) and initial modulus (g/d) fall within the range of acceptability for textile applications and that the shrinkage increases with increasing concentration of Me5-6. Both the hot-wet shrinkage at the boil (212° F.) and at 270° F. (autoclave) correlate with % Me5-6. The dry heat shrinkage at 248° F., (forced air oven) however peaks at the 90/10 nylon 66/Me5-6 level then tends to decrease with increasing Me5-6.

TABLE II

| | | PHYSICAL PROPERTIES | | | | | |
|---|---|---|---|---|---|---|---|
| Nylon 66/Me5-6 | Den. | Tenacity (gd) | Elong. E % | Mod. M (gd) | Shrinkage (%) | | |
| | | | | | Wet | | Dry |
| | | | | | 212° F. | 270° C. | 248° F. |
| 100/0 | 76.3 | 4.28 | 23.51 | 44.3 | 13.98 | 15.47 | 6.35 |
| 90/10 | 71.7 | 4.91 | 16.56 | 47.3 | 17.35 | 20.40 | 7.74 |
| 80/20 | 69.0 | 3.94 | 26.69 | 44.7 | 20.01 | 25.39 | 5.81 |
| 60/40 | 71.9 | 3.58 | 48.44 | 35.8 | 28.14 | 39.56 | 3.35 |

Another important property of nylon 66/Me5-6 is its ability to absorb more moisture than nylon 66 especially at high RH as shown in Table III. The 70 denier yarns were knit into tubings, dried and exposed at three relative humidity conditions at 70° F. for 24 hours and the % moisture regain was calculated from the weight of the knit tubing dry and after conditioning.

TABLE III

| Nylon 66/Me5-6 | % RH = | Moisture Regain (%) | | |
|---|---|---|---|---|
| | | 55 | 75 | 95 |
| 100/0 | | 2.94 | 3.74 | 7.29 |
| 90/10 | | 2.58 | 4.03 | 7.45 |
| 80/20 | | 3.15 | 3.90 | 8.12 |
| 60/40 | | 3.21 | 4.35 | 9.05 |

Molecular structure of the spun items were determined by Differential Scanning Calorimetric (DSC), for melting and crystallization temperatures, and by the standard wide angle and low angle X-ray diffraction methods for crystallinity, and crystal chain orientation. The crystalline perfection index (CPI) was measured and calculated and the findings for both the off-package and boiled-off yarn are summarized in Table IV.

TABLE IV

| Nylon 66/Me5-6 | Melting Point (°C.) | Crystallization Point (°C.) | X-Ray Diffraction | | | |
|---|---|---|---|---|---|---|
| | | | Off-Pkg | | Boiled-off (100° C.) | |
| | | | CPI | OA (°) | CPI | OA (°) |
| 100/0 | 262.00 | 232.89 | 62.8 | 16.1 | 85.3 | 15.8 |
| 90/10 | 252.84 | 226.83 | 41.6 | 16.5 | 75.5 | 16.9 |
| 80/20 | 242.81 | 217.46 | ND* | 17.3 | 84.2 | 19.0 |
| 60/40 | 220.81 | 194.58 | ND* | 16.4 | 85.2 | 23.4 |

*Not detectable; CPI sensitive down to 20–25 units

The (Crystal Perfection Index) CPI of the as-spun-drawn yarn decreased with increasing Me5-6 content but the change in crystalline orientation (OA) was negligible. Surprisingly, the crystallinity of the copolyamides increased dramatically and had a greater difference in CPI than the homopolymer nylon 66 after boil-off. The crystalline orientation of the copolyamides decreased after boil-off (the OA increased).

To compare the dye affinities of the nylon 66/Me5-6 copolyamides to that of the nylon 66 control, the following three diagnostic dyeings were performed with the 90/10 and 80/20 nylon 66/Me5-6. Each was paired with the nylon 66 control in separate baths in the TEXOMAT dyeing apparatus made by Ahiba (Charlotte, N.C.)

1. "Cold disperse" dyeing detects differences in micro-structure porosity and is not influenced by the level or type of dye sites in the nylon. About 5 grams of each item in knit-tubing form were first scoured in the same bath with 0.1 gram per liter MERPOL HCS (Trademark for ethylene oxide condensate dyeing assist sold by Du Pont) and 0.1 gram per liter ammonia at 140° F. for 15 minutes and then rinsed with cool water. The bath at 40:1 liquor to fiber ratio was set at 80° F. and 1% MERPOL HCS and 1% DUPONOL D (Trademark for sodium mixed long chain alcohol sulfate dyeing assist and detergent sold by Du Pont) paste were added based on the weight of the fiber. The pH was adjusted to 9.0 with trisodium phosphate, and after 5 minutes, the dye, Intrasperse Brilliant Blue B SPR was added at 0.5%. The dyeing was run for one hour at 80° F. The bath was then dropped, the tubings rinsed with cool water and allowed to air dry.

2. Dyeing with a pre-metalized dye also detects differences in micro-structure porosity but is slightly affected by the level of amine dye sites in the fiber. This dyeing also illustrates the capability to achieve tonal coloration at equilibrium dyeing. About 5 grams of each item in knit-tubing form were first scoured in the same bath with 0.5% DUPONOL RA (Trademark for fortified sodium ether alcohol sulfate detergent sold by Du Pont) and 0.5% tetrasodiumpyryophosphate at 180° F. for 20 minutes and then rinsed with cool water. The bath, at 40:1 liquor to fiber ratio was set at 80° F. with 0.750% IRGASOL SW (Trademark for aliphatic nitrogenous ethylene oxide condensate leveling and retarding agent sold by Ciba Geigy), 3.0% ammonium sulfate, 1.0% ammonia the pH adjusted to 7.0 with ammonia, and the dye, 0.75% Irgalan Black GBL was added. The temperature of the bath was raised at 1° F./minute to 212° F. and the dyeing was run for one hour. The bath was then dropped. The tubings were rinsed with cool water and allowed to air dry.

3. Dyeing with a leveling acid dye detects differences in the amine end level but is also influenced by the micro porosity of the fiber. In this dyeing, the scour procedure in dyeing #1 was used. The bath, at 40:1 liquor to fiber ratio was set at 80° F. and 5.0 grams per liter monosodium phosphate was added, and the pH was adjusted to about 5.8 with caustic or phosphoric acid. After five minutes, the dye, Du Pont Anthraquinone Blue B was added at 0.75% and the temperature was raised to 212° F. at 3° F./minute and the pH readjusted to 5.8. The dyeing was run for two hours at 212° F. The bath was then dropped, and tubings were rinsed with cool water and allowed to air dry.

The reflectance, R, of the color on each tubing was then read with a Macbeth 1500+ spectrophotometer and the K/S value was calculated as described in U.S. Pat. No. 4,030,880, which is hereby incorporated by reference. The data for all three dyeings are summarized in Table V:

TABLE V

| Dyeing | Pair | Nylon 66/Me5-6 | K/S | Wavelength (Nanometers) |
|---|---|---|---|---|
| (1) | A | 100/0 | 1.8836 | 600 |
|  |  | 90/10 | 2.8363 |  |
|  | B | 100/0 | 2.3841 |  |
|  |  | 80/20 | 5.0067 |  |
| (2) | A | 100/0 | 3.6646 | 580 |
|  |  | 90/10 | 8.3034 |  |
|  | B | 100/0 | 12.0231 |  |
|  |  | 80/20 | 21.8900 |  |
| (3) | A | 100/0 | 14.5080 | 640 |
|  |  | 90/10 | 16.2707 |  |
|  | B | 100/0 | 16.2559 |  |
|  |  | 80/20 | 17.3022 |  |

These competitive dyeings show that in each case the nylon 66/Me5-6 had greater affinity for dye than nylon 66 and that under equilibrium dyeing conditions, as used to piece dye nylon automotive upholstery (dying #2), two tone coloration can be achieved. The 80/20 copolyamide fiber had an amine end level (55.7 equiv./$10^6$ g.) similar to that of the nylon control (55.4 equiv./$10^6$ g). The copolyamide and nylon-6,6 items were also dyed in separated baths and tested for dye stability. None of the items had a dry or wet crocking problem as tested by AATCC test method 8-1985 and dyeings (1) and (3) had acceptable dye-lightfastness at 80 hrs. exposure in the fadeometer, and (2) was acceptable at 225 kilojoules in the General Motors Xenon-arc Weather-Ometer test procedure specified for automotive upholstery.

EXAMPLE II

This example illustrates pilot scale polymerization procedures for selected nylon 66/Me5-6 copolyamides of this invention.

The salt of 2-methylpentamethylene diamine (MPMD) and adipic acid was prepared using pilot plant size equipment as a batch operation. Three-hundred and eighteen pounds of MPMD and 400 pounds of adipic acid were mixed with water to a 60% by weight concentration at 50 degrees centigrade. The pH, measured in the lab at 25 degrees centigrade and at a 9.5% concentration, was 7.8 to 8.9.

Several mixes were blended together and pumped to an evaporator transfer tank. An amount of the MPMD/adipic acid salt was then metered from the transfer tank into the evaporator to give the desired polymer ratio with hexamethylene diamine/adipic acid salt metered in from another transfer tank which was at a concentration of 51.8% and a pH of 7.7 to 7.72. In the case of a 95/5 66/Me5-6 copolymer batch, 156 pounds of MPMD adipic acid salt was used and 2973 pounds of nylon 66 salt was used. This will yield a theoretical polymer batch of 2700 pounds. Table VI(a) summarized the quantitives used for the different batches. Polymer batches were analyzed using liquid chromatography to confirm copolymer ratios.

The evaporation part of the process was now initiated. Three hundred pound steam was used as the heating medium in a shell and tube type heat exchanger using natural circulation through the attached calandria. Steam flow rate was measured and controlled using a conventional control algorithm. The steam flow set point followed a specified profile for optimum steam utilization and desired cooking time of 21.75 minutes in the case of the 95%/5% copolymer. Cooking time changed for each different copolymer ratio.

Evaporator body pressure also was controlled using a conventional control algorithm and an evaporator process pressure profile. Evaporator process temperatures were continually monitored and, when the specified temperature was reached, the evaporation process was terminated. For example, for the 95%/5% copolymers, the batch was terminated at a vapor temperature of 147 degrees centigrade which corresponds to a salt concentration of about 75%. Two hundred milliliters of Dow Corning antifoam B was added to each batch in the evaporator for foam control.

The concentrated salt batch was now transferred to an autoclave. Dowtherm was used as the heat transfer medium in the autoclave jacket and autoclave coils. Dowtherm pressure was controlled using a conventional control algorithm which followed a pressure profile. Autoclave pressure was the other control parameter and also used control algorithms and a pressure profile. In the autoclave, polymer modifiers were added—titanium dioxide to impart white color to the polymer, acetic acid to control the polymer relative viscosity, and additional Dow Corning antifoam B to control foaming. Manganese hypophosphite as a catalyst was added to the salt solutions at the level of about 11 parts per million (ppm).

The autoclave process described below is for the 95%/5% copolymer. Conditions were changed as the Me5-6 ratio was increased because of the lower melting point of the polymers as shown in Table VI(a) which summarizes quantities used and process conditions. Dowtherm pressure was increased from 20 psia to 40 psia. Autoclave process pressure increased until desired set point of 280 psia was obtained. The pressure was controlled at this set point until polymer temperature increased to 245 degrees centigrade. The increase in autoclave pressure and the increase in polymer temperature took about 67 minutes. By this time the Dowtherm pressure has ramped up to 45 psia. At 245 degrees, the autoclave pressure has ramped down to 14.8 psia in 60 minutes. The polymer temperature continued to increase during this time and when the temperature reached 267 degrees, the Dowtherm was cut off. The autoclave pressure was controlled at 14.8 psia for 15 minutes during which time the polymer temperature leveled out at 272 degrees. Finally, inert gas pressure of 105 psia was applied for the purposes of extruding the polymer from the autoclave.

The molten polymer is extruded from the autoclave, quenched in water, and chipped. The polymer was forced out of the autoclave using the 105 psi inert gas pressure through a 40 hole metal dye. The strands dropped onto a moving belt covered with water from numerous spray nozzles. The belt conveyed the now solid polymer into a rotating cutter which chipped the strands into ¼" by ⅛" pieces. These pieces were further cooled and dried before being stored in boxes or large metal blenders for use in the spinning machine.

Polymer samples were taken and analyzed for percent TiO₂, amine ends, and relative viscosity. Results are tabulated in Table VI(b).

used to spin 1.8 denier per filament (dpf) fibers with a trilobal cross-section having an as spun total bundle denier of 5,400–6,400. The flake was conditioned and melted so that the relative viscosity (RV) of the copolyamide was 55.7 in the spun yarn. The RV of the control nylon 66 in the spun yarn, which was made for the spinning of commercial fiber, was 59.7.

Using prototype plant equipment, three items were

TABLE VI(a)

| | Mole % Me5/6 | | | | |
|---|---|---|---|---|---|
| | 0% | 5% | 10% | 20% | 35% |
| TRANSFER TANK | | | | | |
| 66 Dry Salt (lbs) | 3245 | 2973 | 2816 | 2503 | 2034 |
| MPMD,6 Dry Salt (lbs) | 0 | 156 | 313 | 626 | 1095 |
| EVAPORATOR | | | | | |
| Process Pressure (psia) | 34.0 | 34.0 | 34.0 | 34.0 | 34.0 |
| Steam Flow (1000 lb/hr) | 9.0 | 9.0 | 9.0 | 9.0 | 9.0 |
| Vapor Temp. (°C.) | 149 | 147 | 147 | 147 | 147 |
| Time Nominal (min.) | 23 | 21.75 | 21.25 | 20.25 | 18.25 |
| AUTOCLAVE | | | | | |
| Press. + Temp. Buildup Cycles (min.) | 67 | 67 | 67 | 64 | 53 |
| Process Pressure (psia) | 270 | 280 | 280 | 280 | 235 |
| Dowtherm Press. #1 (psia) | 40 | 40 | 38 | 36 | 44 |
| Dowtherm press. #2 (psia) | 45 | 45 | 45 | 40 | 45 |
| Polymer Temp. to Start Press Reduce (°C.) | 245 | 245 | 242 | 234 | 230 |
| Polymer Temp. at Dowtherm Cut-off (°C.) | 267 | 267 | 262 | 250 | 246 |
| Press. Reduct. Time (min.) | 60 | 60 | 60 | 60 | 50 |
| Holding Time (min.) | 15 | 15 | 15 | 15 | 35 |
| Polymer Extrusion Temp. (°C.) | 272 | 272 | 267 | 255 | 255 |
| Extrusion Time Aim (min) | 19 | 19 | 19 | 30 | 35 |
| EXTRUSION MACHINE | | | | | |
| Belt Speed (rpm) | 122/330 | 122/330 | 122/330 | 58/170 | 58/170 |
| Cooling H₂O Flow (gpm) | 65/35 | 65/35 | 65/35 | 65/50 | 65/50 |

TABLE VI(b)

| Me5-6 (%) | TiO₂ | NH₂ | RV |
|---|---|---|---|
| 5 | 0.3 | 51.9 | 39.7 |
| 5 | 0.3 | 52.3 | 40.9 |
| 5 | 0.3 | 52.5 | 41.3 |
| 5 | 0.3 | 51.5 | 40.1 |
| 10 | 0.3 | 56.1 | 39.1 |
| 10 | 0.3 | 55.3 | 39.4 |
| 10 | 0.3 | 54.8 | 39.5 |
| 15 | | 43.7 | 39.5 |
| 20 | | 64.1 | 35.8 |
| 20 | | 64.7 | 33.4 |
| 20 | | 64.4 | 34.7 |
| 20 | 0.3 | 66.4 | 33.6 |
| 20 | 0.3 | 66.1 | 33.1 |
| 20 | 0.3 | 66.3 | 32.5 |
| 35 | | 77.5 | 29.5 |
| 35 | | 56.9 | 30.6 |
| 35 | 0.3 | 51.5 | 36.3 |
| 35 | 0.3 | 54.3 | 34.4 |
| 35 | 0.3 | 54.2 | 34.4 |
| 35 | 0.3 | 55.8 | 33.7 |
| 35 | 0.3 | 55.4 | 33.3 |

To illustrate the melt spinnability of the copolyamide on a prototype split process for making tow, the 80/20 nylon 66/Me5-6 flake prepared as described above was made with the control flake at three different spin speeds and three items were made with the copolyamide at speeds similar to the control flake. Spin speeds were chosen to determine the optimum spinning conditions necessary to produce the product. The two flake items were spun on a conventional nylon spinning process using the conditions shown in the following Table VII.

TABLE VII

| | Nylon 66 | Nylon 66/Me5-6 |
|---|---|---|
| Screw Temp 1 | 268° C. | 245° C. |
| Zones 2 | 274 | 250 |
| 3 | 282 | 265 |
| 4 | 287 | 275 |
| Quench Chimney Air | | |
| Flow | 350 | 350 |
| Temp °F. | 55 | 55 |

The spun tow items were drawn on an experimental draw machine at 2.6×, 2.75 and 3-3.1× draw ratios. A water base finish was applied at the draw machine to help in processing the yarn. The spin speeds, fiber properties and fiber structure of the items made are summarized in Table VII.

TABLE VIII

| 6.6/Me5-6 (80/20) FIBER CHARACTERIZATION | | | | | | | | | | | |
|---|---|---|---|---|---|---|---|---|---|---|---|
| | | | | | | | X-RAY DIFFRACTION | | | | |
| SAMPLE | D.R. | DPF | TEN | ELONG | SHRINK | DENSITY | S(D) | BETA | CPI | ACS' | ACS" | OA (°) |
| AS SPUN | | | | | | | | | | | | |
| C-1 | — | — | | 347.5 | — | 1.1308 | 0.0000 | 44.2 | 45.6 | 33.8 | 28.3 | 54.5 |
| C-2 | — | — | | 332.5 | — | 1.1306 | 0.0003 | 44.0 | 47.4 | 35.6 | 28.4 | 46.5 |
| C-3 | — | — | | 282.9 | — | 1.1305 | 0.0008 | 43.9 | 49.9 | 38.8 | 30.7 | 44.6 |

TABLE VIII-continued 6,6/Me5-6 (80/20) FIBER CHARACTERIZATION

| SAMPLE | D.R. | DPF | TEN | ELONG | SHRINK | DENSITY | X-RAY DIFFRACTION ||||| OA (°) |
|---|---|---|---|---|---|---|---|---|---|---|---|---|
| | | | | | | | S(D) | BETA | CPI | ACS' | ACS" | |
| MPMD-1 | | — | — | 279.8 | — | 1.1291 | 0.0000 | 43.0 | xxx | 35.3 | — | 52.0 |
| MPMD-2 | | — | — | 288.0 | — | 1.1293 | 0.0003 | 43.1 | xxx | 26.4 | — | 51.4 |
| MPMD-3 | | — | — | 252.8 | — | 1.1266 | 0.0007 | 41.2 | xxx | 29.4 | — | 41.9 |
| DRAWN | SPEED | | | | | | | | | | | |
| C-1 | 1080 | 3.0 | 1.56 | 5.10 | 33.7 | — | 1.1330 | 0.0002 | 45.6 | 68.5 | 45.7 | 30.3 | 19.7 |
| C-2 | 1150 | 2.75 | 1.81 | 5.10 | 59.0 | — | 1.1281 | 0.0000 | 42.3 | 64.0 | 42.9 | 30.4 | 23.1 |
| C-3 | 1200 | 2.60 | 1.65 | 4.90 | 59.6 | — | 1.1313 | 0.0003 | 44.5 | 57.6 | 41.2 | 28.7 | 19.5 |
| MPMD-1 | 1050 | 3.1 | 1.77 | 4.60 | 86.9 | — | 1.1260 | 0.0003 | 40.9 | xxx | 32.8 | — | 22.5 |
| MPMD-2 | 1180 | 2.7 | 1.92 | 4.30 | 81.2 | — | 1.1243 | 0.0003 | 39.8 | xxx | 31.9 | — | 24.0 |
| MPMD-3 | 1230 | 2.6 | 1.83 | 4.20 | 107.1 | — | 1.1248 | 0.0002 | 40.1 | xxx | 33.0 | — | 24.8 |
| BOIL-OFF | | | | | | | | | | | | |
| C-1/BO | | 2.03 | 5.90 | 83.5 | 9.7 | 1.1395 | 0.0000 | 50.0 | 80.0 | 58.8 | 36.6 | 15.5 |
| C-2/BO | | 1.92 | 5.10 | 86.6 | 9.4 | 1.1435 | 0.0005 | 52.6 | 80.9 | 58.1 | 37.7 | 14.7 |
| C-3/BO | | 1.63 | 5.20 | 76.8 | 9.8 | 1.1429 | 0.0000 | 52.2 | 80.2 | 57.0 | 37.2 | 15.4 |
| MPMD-1/BO | | 1.73 | 3.90 | 90.0 | 11.3 | 1.1382 | 0.0004 | 49.2 | 61.1 | 57.7 | 31.6 | 19.0 |
| MPMD-2/BO | | 2.33 | 3.50 | 121.8 | 16.7 | 1.1381 | 0.0002 | 49.1 | 63.6 | 55.3 | 30.8 | 20.0 |
| MPMD-3/BO | | 2.10 | 3.40 | 144.5 | 15.1 | 1.1353 | 0.0005 | 47.2 | 61.5 | 58.2 | 30.3 | 20.7 |

NOTES:
xxx CPI'S too low to measure (<15)
— ACS cannot be read at this low crystallinity level
BETA-weight fraction crystallinity from density The fiber density measurements confirm the lower crystallinity of the as-spun Me5-6 copolyamides Me5-1, Me5-2, and Me5-3 compared to the nylon-6,6 controls C-1, C-2, and C-3 and again, the surprising increase in crystallinity of the 80/20 nylon 66/Me5-6 after boil-off. Competitive dyeings with dyeing procedure 1 as in Example I show that the higher dye affinity for the copolyamide also occurs with split processed fiber. (Table IX)

TABLE IX

| DYEING PROCEDURE ||| |
|---|---|---|
| Set | Items | K/S |
| 1 | C-1 | 2.1230 |
| | C-2 | 2.3452 |
| | C-3 | 2.4011 |
| 2 | MPMD-1 | 3.4864 |
| | MPMD-2 | 3.9721 |
| | MPMD-3 | 3.8842 |
| 3 | C-1 | 1.8723 |
| | MPMD-1 | 4.2014 |
| 4 | C-2 | 1.9832 |
| | MPMD-2 | 4.0254 |
| 5 | C-3 | 2.4295 |
| | MPMD-3 | 4.1339 |

The initial yellow color and the photo-yellowing of the nylon 66/Me5-6 copolyamide was compared to the control nylon 66. Samples of MPMD-1, MPMD-2, and C-2 were wound on 2½" wide cards and exposed in the General Motors Xenon-Arc Weather-Ometer up to 500 kilojoules. The yellowing was determined by reading the reflectance of the exposed and unexposed samples with a Macbeth 1500+ Spectrophotometer at daylight 6500 Kelvin illumination and an observer angle, of 10 degrees. The results in Table X show that the initial yellow cast of the nylon 66/Me5-6 copolyamide in terms of the "b" value is similar to the control, but surprisingly, yellowed less than the control upm exposure.

TABLE X

| Test Item | Kj = | "b" Value |||| |
|---|---|---|---|---|---|
| | | 0 | 100 | 200 | 300 | 500 |
| MPMD-2 | | 1.63 | 1.95 | 2.20 | 2.38 | 3.17 |

TABLE X-continued

| Test Item | Kj = | "b" Value |||| |
|---|---|---|---|---|---|
| | | 0 | 100 | 200 | 300 | 500 |
| C-2 | | 1.51 | 3.02 | 2.97 | 4.39 | 4.19 |

EXAMPLE III

This example demonstrates the improvement obtained in a wipe cycles using a 95%/5% 66/Me-5 copolyamide compared to a control using a 98.5%/1.5% (weight %) nylon 66/6 copolyamide.

13 denier (1.9 dpf) draw texturing feed yarns were spun from 95% 66/Me5-6 copolyamide prepared as described in Example II and a 98.5%/1.5% bylon 66/6 copolyamide prepared similarly. The RV of the MPMD copolyamide was 39.7 with 51.9 amine ends and the RV of the nylon 6/66 copolyamide was 36.1 with 42.9 amine ends. For the spinning of both copolyamides, a process as described in U.S. Pat. No. 3,994,121 was used with the melt temperature being 293° C. and the quench being a 210 cubic feet/minute (cfm) quench of 65° F. air. After the yarns pass through a steam conditioner and are converged for finish application and interlacing, the yarns are wound up at 3100 yards per minute (ypm).

The process with each copolymer was run for extended periods and the length of time possible between "wipe cycles" was observed. "Wiping" is done to remove "monomer" accumulation from the face of the spinneret and all guides and yarn surfaces are changed or cleaned. In this process, "monomer" which refers to deposits of low molecular weight polymeric species, accumulates at the top of the chimney and the threadlines bend as they exit the spinneret until they break. In for each copolymer, the position was "wiped" when a yarn end broke due to the monomer accumulation.

The machine used has a wind-up capacity of 18 pound packages which would require 31 hours before interrupting the position. The process with the nylon 66/6 copolymer ran an average of 15 hours before spontaneously breaking. To minimize breaks, the doff and wipe cycle were set at 16 hours, producing 9.3 pound packages.

Using the 66/Me5-6 copolymer, the upper limit for the wipe cycle was increased to the extent that it could not be defined before the wind-up capacity was reached. After the 30 hours, there was no sign of bent filaments or monomer accumulation as found in the process using nylon 66/6 indicating substantially less "monomer" in the molten polymer being spun.

EXAMPLE IV

In this example, draw-texturing feed yarns were prepared from 66/Me5-6 produced as in Example II to provide copolyamide yarns with the % Me5-6 ranging from 5 to 35% by weight. The spin temperature was decreased to correspond to the decreased polymer melt temperatures. Table XI summarizes the spinning and property data for the yarns spun over a spin speed range of 4500 to 5900 mpm and an RV range of from about 40 to about 70 RV with 0.3% TiO2.

The starting polymer RV was about 46.5, 39.3, 33.1, and 35.0 for copolymers containing 5%, 10%, 20%, and 35% Me5-6, respectively. Nominal 53 denier 13-filament yarns were spun, interlaced and finish applied at a level of about 0.45% weight %. The filaments were extruded through spinneret capillaries of 0.254 mm diameter with a 1.9 L/D-ratio and quenched with 75% RH room temperature air at 18 mpm crossflow and converged by a metered finish tip applicator at 135 cm.

TABLE XI

| ITEM NO. | DEN | SPEED MPM | MPMD % | YARN RV | Tp C | DT G/D | EB % |
|---|---|---|---|---|---|---|---|
| VIII-1 | 51.3 | 4500 | 5 | 49.6 | 290 | 0.90 | 85.9 |
| VIII-2 | 50.8 | 4500 | 5 | 56.4 | 290 | 0.86 | 87.5 |
| VIII-3 | 51.1 | 4500 | 5 | 66.4 | 290 | 0.87 | 88.5 |
| VIII-4 | 51.5 | 5000 | 5 | 49.6 | 290 | 1.08 | 79.0 |
| VIII-5 | 51.1 | 5000 | 5 | 56.4 | 290 | 1.01 | 81.3 |
| VIII-6 | 50.5 | 5000 | 5 | 66.4 | 290 | 0.99 | 83.7 |
| VIII-7 | 51.3 | 5300 | 5 | 49.6 | 290 | 1.19 | 74.3 |
| VIII-8 | 50.7 | 5300 | 5 | 56.4 | 290 | 1.12 | 78.3 |
| VIII-9 | 50.7 | 5300 | 5 | 66.4 | 290 | 1.10 | 81.5 |
| VIII-10C | 51.5 | 5600 | 5 | 49.6 | 290 | 1.33 | 71.4 |
| VIII-11C | 51.4 | 5600 | 5 | 56.4 | 290 | 1.24 | 74.8 |
| VIII-12 | 50.9 | 5600 | 5 | 66.4 | 290 | 1.19 | 79.7 |
| VIII-13C | 56.9 | 5900 | 5 | 49.6 | 290 | 1.39 | 67.1 |
| VIII-14C | 50.9 | 5900 | 5 | 56.4 | 290 | 1.32 | 72.5 |
| VIII-15C | 51.0 | 5900 | 5 | 66.4 | 290 | 1.30 | 75.8 |
| VIII-16 | 50.7 | 4500 | 10 | 47.6 | 280 | 0.92 | 78.4 |
| VIII-17 | 51.9 | 4500 | 10 | 54.6 | 280 | 0.97 | 80.6 |
| VIII-18 | 51.3 | 4500 | 10 | 61.9 | 280 | 0.83 | 88.0 |
| VIII-19 | 52.0 | 5000 | 10 | 47.6 | 280 | 1.08 | 73.0 |
| VIII-20 | 51.1 | 5000 | 10 | 54.6 | 280 | 1.04 | 78.5 |
| VIII-21 | 51.8 | 5000 | 10 | 61.9 | 280 | 0.96 | 81.0 |
| VIII-22 | 51.9 | 5300 | 10 | 47.6 | 280 | 1.17 | 71.0 |
| VIII-23 | 51.7 | 5300 | 10 | 54.6 | 280 | 1.09 | 77.2 |
| VIII-24 | 51.7 | 5300 | 10 | 61.9 | 280 | 1.09 | 78.0 |
| VIII-25C | 52.0 | 5600 | 10 | 47.6 | 280 | 1.29 | 66.0 |
| VIII-26 | 51.9 | 5600 | 10 | 54.6 | 280 | 1.13 | 72.2 |
| VIII-27 | 51.1 | 5600 | 10 | 61.9 | 280 | 1.16 | 75.5 |
| VIII-28 | 51.9 | 5900 | 10 | 47.6 | 280 | 1.40 | 60.2 |
| VIII-29 | 51.6 | 5900 | 10 | 54.6 | 280 | 1.25 | 67.8 |
| VIII-30C | 51.5 | 5900 | 10 | 61.9 | 280 | 1.18 | 73.4 |
| VIII-31 | 52.5 | 4500 | 20 | 39.9 | 275 | 1.09 | 72.0 |
| VIII-32 | 51.9 | 4500 | 20 | 50.1 | 275 | 0.83 | 80.7 |
| VIII-33 | 51.0 | 4500 | 20 | 66.8 | 275 | 0.87 | 80.6 |
| VIII-34C | 52.3 | 5000 | 20 | 39.9 | 275 | 1.22 | 66.7 |
| VIII-35 | 52.0 | 5000 | 20 | 50.1 | 275 | 1.03 | 74.2 |
| VIII-36 | 51.7 | 5000 | 20 | 66.8 | 275 | 0.99 | 76.8 |
| VIII-37C | 53.4 | 5300 | 20 | 39.9 | 275 | 1.25 | 66.5 |
| VIII-38 | 51.8 | 5300 | 20 | 50.1 | 275 | 1.09 | 72.8 |
| VIII-39 | 50.5 | 5300 | 20 | 66.8 | 275 | 1.04 | 74.5 |
| VIII-40C | 52.1 | 5600 | 20 | 39.9 | 275 | 1.33 | 62.2 |
| VIII-41 | 51.9 | 5600 | 20 | 50.1 | 275 | 1.18 | 67.7 |
| VIII-42 | 51.4 | 5600 | 20 | 66.8 | 275 | 1.14 | 71.0 |
| VIII-43C | 52.1 | 5900 | 20 | 39.9 | 275 | 1.43 | 57.9 |
| VIII-44C | 52.0 | 5900 | 20 | 50.1 | 275 | 1.35 | 63.7 |
| VIII-45C | 51.7 | 5900 | 20 | 66.8 | 275 | 1.25 | 68.7 |
| VIII-46 | 52.2 | 4500 | 35 | 47.6 | 275 | 0.88 | 75.7 |
| VIII-47 | 51.9 | 4500 | 35 | 61.0 | 275 | 0.83 | 80.2 |
| VIII-48 | 51.7 | 4500 | 35 | 68.3 | 275 | 0.82 | 80.6 |
| VIII-49 | 52.5 | 5000 | 35 | 47.6 | 275 | 1.09 | 69.9 |
| VIII-50 | 51.9 | 5000 | 35 | 61.0 | 275 | 0.97 | 74.8 |
| VIII-51 | 51.8 | 5000 | 35 | 68.3 | 275 | 0.95 | 76.8 |
| VIII-52C | 52.5 | 5300 | 35 | 40.6 | 275 | 1.32 | 58.8 |
| VIII-53 | 52.1 | 5300 | 35 | 47.6 | 275 | 1.18 | 66.7 |
| VIII-54 | 52.1 | 5300 | 35 | 61.0 | 275 | 1.08 | 73.6 |
| VIII-55 | 52.3 | 5300 | 35 | 68.3 | 275 | 1.03 | 76.5 |
| VIII-56C | 52.6 | 5600 | 35 | 40.6 | 275 | 1.40 | 59.3 |
| VIII-57C | 52.7 | 5600 | 35 | 47.6 | 275 | 1.27 | 65.8 |
| VIII-58 | 52.1 | 5600 | 35 | 61.0 | 275 | 1.14 | 68.3 |
| VIII-59 | 52.0 | 5600 | 35 | 68.3 | 275 | 1.11 | 72.7 |
| VIII-60C | 52.5 | 5900 | 35 | 40.6 | 275 | 1.50 | 57.0 |
| VIII-61C | 50.2 | 5900 | 35 | 47.6 | 275 | 1.36 | 63.0 |
| VIII-62 | 54.7 | 5900 | 35 | 61.0 | 275 | 1.22 | 66.2 |

TABLE XI-continued

| ITEM NO. | DEN | SPEED MPM | MPMD % | YARN RV | Tp C | DT G/D | EB % |
|---|---|---|---|---|---|---|---|
| VIII-63 | 51.7 | 5900 | 35 | 68.3 | 275 | 1.21 | 67.2 |

I claim:

1. A copolyamide consisting essentially of between about 60 and about 99.5 mole percent hexamethylene adipamide units and between about 0.5 and 40 mole percent 2-methyl-pentamethylene adipamide units, said copolyamide having a relative viscosity greater than about 25, and a melting point of greater than about 220° C., said relative viscosity being measured at 25° C. in a solution of 8.4% by weight polyamide polymer in 90% formic acid.

2. The copolyamide of claim 1 wherein said relative viscosity is between about 30 and about 80.

3. The copolyamide of claim 1 wherein said relative viscosity is between about 30 and about 60.

4. The copolyamide of claim 1 wherein said copolyamide has a molecular weight distribution in which less than about 10% of said copolyamide comprises copolymer having a molecular weight of less than about 10,000, wherein molecular weight distribution is determined by gel permeation chromatography with a mobile phase of 0.01M sodium trifluoroacetate in hexafluoroisopropanol and calibrating via a cumulative matching technique with an assumed most probable distribution of species for a nylon 66 laboratory standard.

5. The copolyamide of claim 1 wherein less than 60% of extractables have a molecular weight of less than 500, wherein extractables are the oligomer fraction contained in a solution of the copolyamide prepared by dissolving a weighed sample in formic acid and precipitating the high molecular weight fraction from a 5:1 methanol-water solution, the molecular weight of extractables being determined by gel permeation chromatography.

6. A fiber of the copolyamide of claim 1.

7. A fiber-forming copolyamide consisting essentially of between about 90 and about 99.5 mole percent hexamethylene adipamide units and between about 0.5 and 10 mole percent 2-methyl-pentamethylene adipamide units, said copolyamide having a relative viscosity greater than about 25, and a melting point of greater than about 220° C., said relative viscosity being measured at 25° C. in a solution of 8.4% by weight polyamide in 90% formic acid.

* * * * *